(12) United States Patent
Nonoyama

(10) Patent No.: US 11,374,240 B2
(45) Date of Patent: Jun. 28, 2022

(54) FUEL-CELL UNIT CELL

(71) Applicant: TOYOTA JIDOSHA KABUSHIKI KAISHA, Toyota (JP)

(72) Inventor: Nobuaki Nonoyama, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 157 days.

(21) Appl. No.: 16/920,896

(22) Filed: Jul. 6, 2020

(65) Prior Publication Data

US 2021/0098800 A1    Apr. 1, 2021

(30) Foreign Application Priority Data

Sep. 30, 2019  (JP) ............................. JP2019-179799

(51) Int. Cl.
| | | |
|---|---|---|
| *H01M 8/0297* | (2016.01) | |
| *H01M 8/0273* | (2016.01) | |
| *H01M 8/1004* | (2016.01) | |
| *H01M 8/0258* | (2016.01) | |
| *H01M 8/10* | (2016.01) | |

(52) U.S. Cl.
CPC ....... *H01M 8/0297* (2013.01); *H01M 8/0258* (2013.01); *H01M 8/0273* (2013.01); *H01M 8/1004* (2013.01); *H01M 2008/1095* (2013.01)

(58) Field of Classification Search
CPC ............. H01M 8/0297; H01M 8/0258; H01M 8/0273; H01M 8/1004
See application file for complete search history.

(56) References Cited

U.S. PATENT DOCUMENTS

| | | |
|---|---|---|
| 2013/0183605 A1 | 7/2013 | Tanaka et al. |
| 2014/0017590 A1 | 1/2014 | Sugishita et al. |
| 2015/0380746 A1 | 12/2015 | Fukuta et al. |
| 2016/0260989 A1 | 9/2016 | Ikeda et al. |
| 2016/0260993 A1 | 9/2016 | Ikeda |
| 2018/0145359 A1 | 5/2018 | Sugishita et al. |
| 2018/0166707 A1 | 6/2018 | Ohmori et al. |

FOREIGN PATENT DOCUMENTS

| | | |
|---|---|---|
| JP | 2013-145653 | 7/2013 |
| JP | 2013-251253 | 12/2013 |
| JP | 5681792 | 7/2014 |
| JP | 2016-012435 | 1/2016 |
| JP | 2016-012444 | 1/2016 |
| JP | 2016-081690 | 5/2016 |
| JP | 2016-162649 | 9/2016 |
| JP | 2016-162651 | 9/2016 |

(Continued)

*Primary Examiner* — Helen Oi K Conley
(74) *Attorney, Agent, or Firm* — Finnegan, Henderson, Farabow, Garrett & Dunner, LLP

(57) ABSTRACT

Disclosed herein is a fuel-cell unit cell, at a first part of which: the fuel-cell unit cell has a bonding layer; between an outer peripheral edge portion of a first gas diffusion layer and a portion of a membrane-electrode assembly on an inner side from an outer peripheral edge portion thereof, the bonding layer bonds these portions together; between a first separator and the outer peripheral edge portion of the membrane-electrode assembly, the bonding layer is bonded to at least the outer peripheral edge portion of the membrane-electrode assembly; and between the first separator and a support frame and/or between a second separator and the support frame, the bonding layer bonds these parts together.

7 Claims, 9 Drawing Sheets

(56) References Cited

FOREIGN PATENT DOCUMENTS

| | | |
|---|---|---|
| JP | 2017-068956 | 4/2017 |
| JP | 2017-168364 | 9/2017 |
| JP | 2017-168370 | 9/2017 |
| JP | 2017-182894 | 10/2017 |
| JP | 6237675 | 11/2017 |
| JP | 2018-097917 | 6/2018 |
| WO | WO 2012/137609 | 10/2012 |

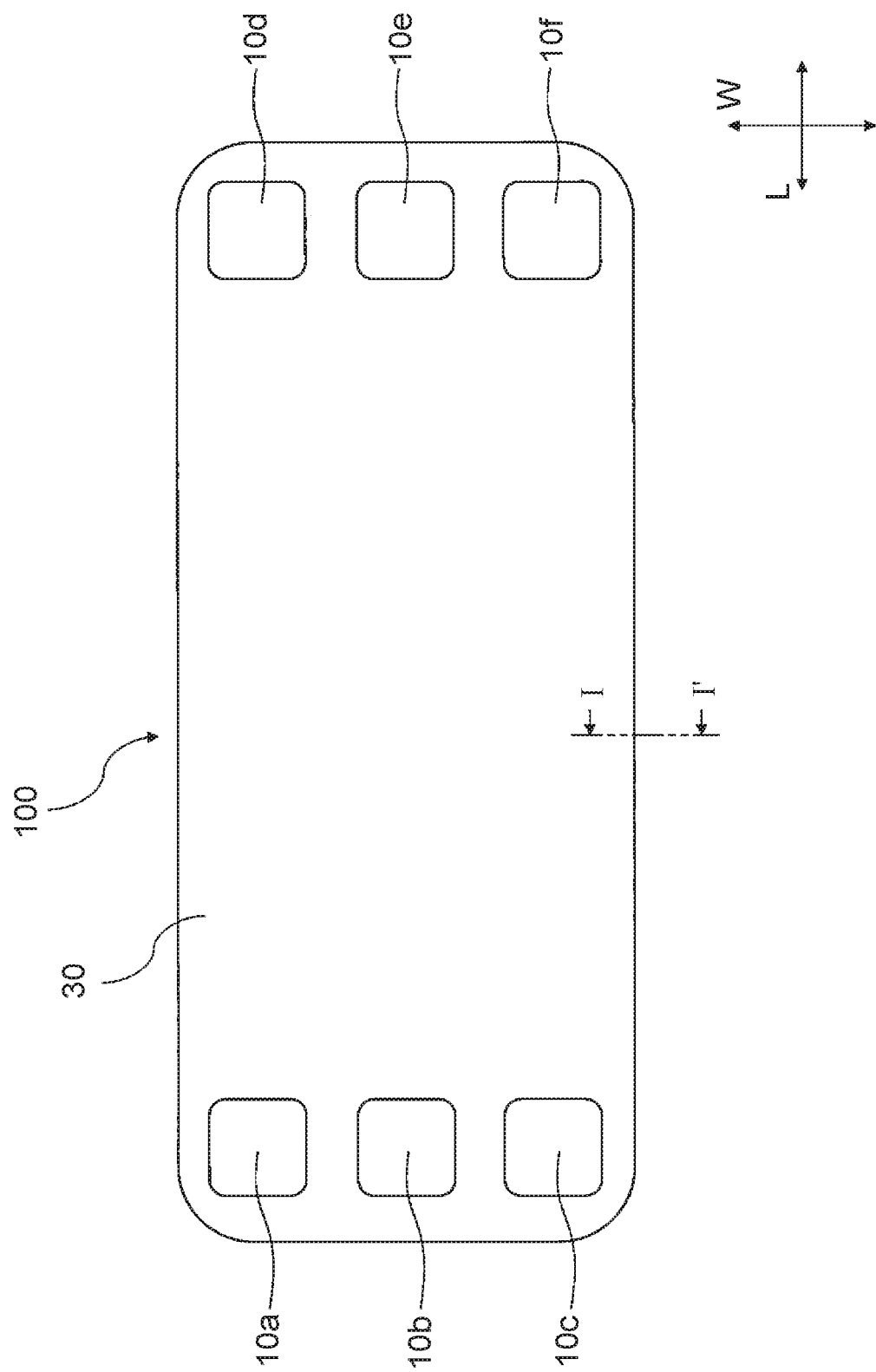

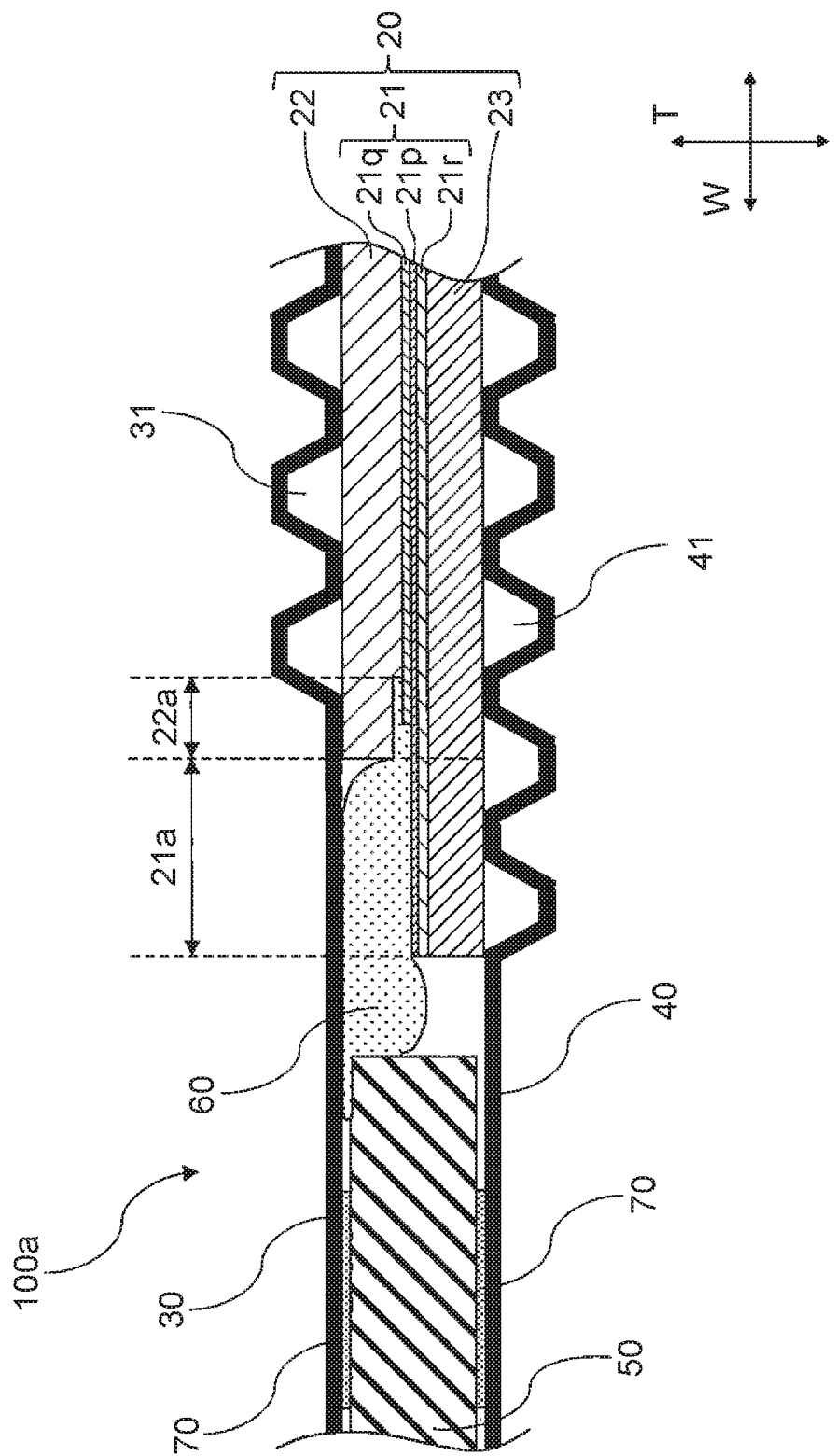

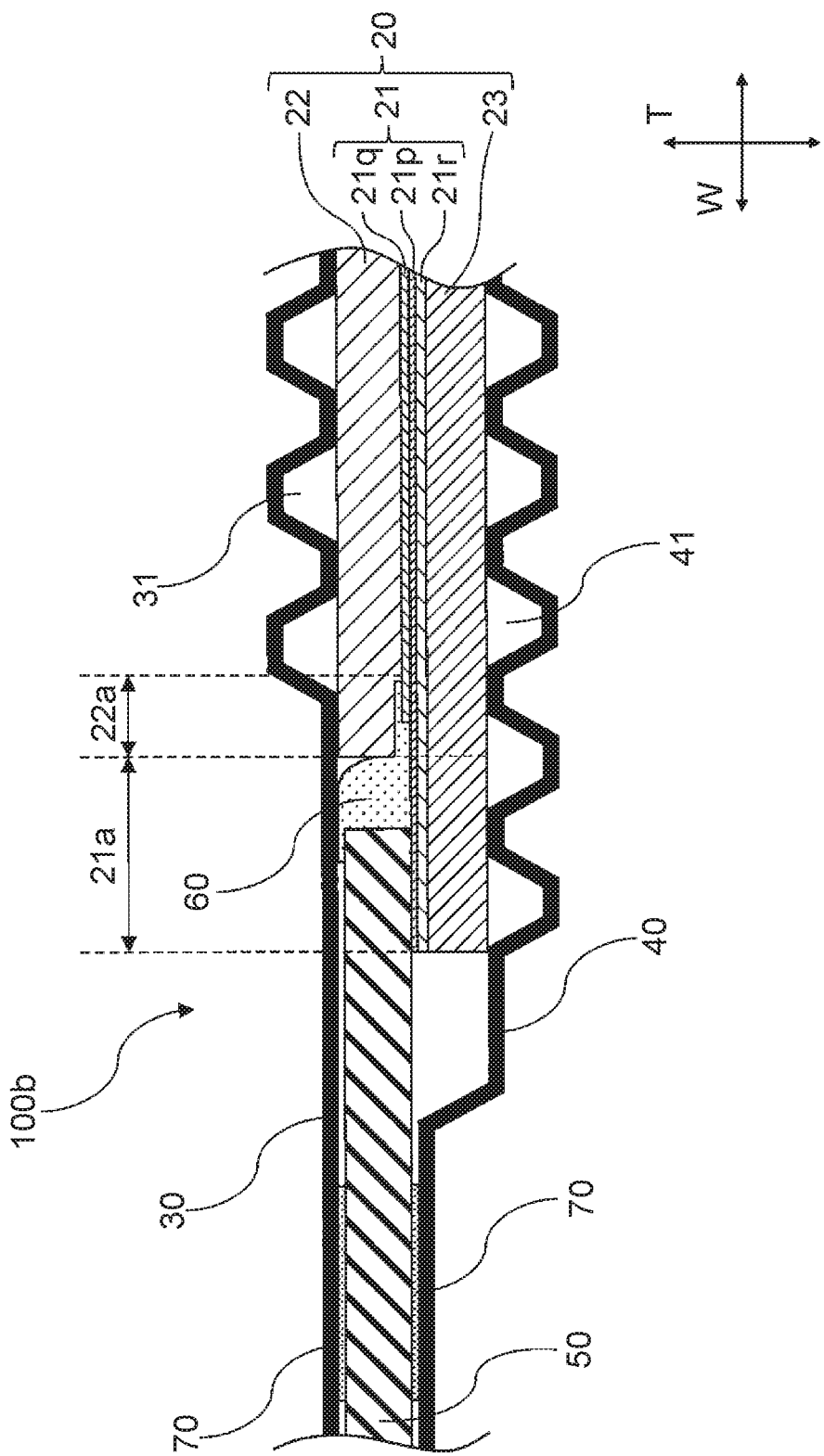

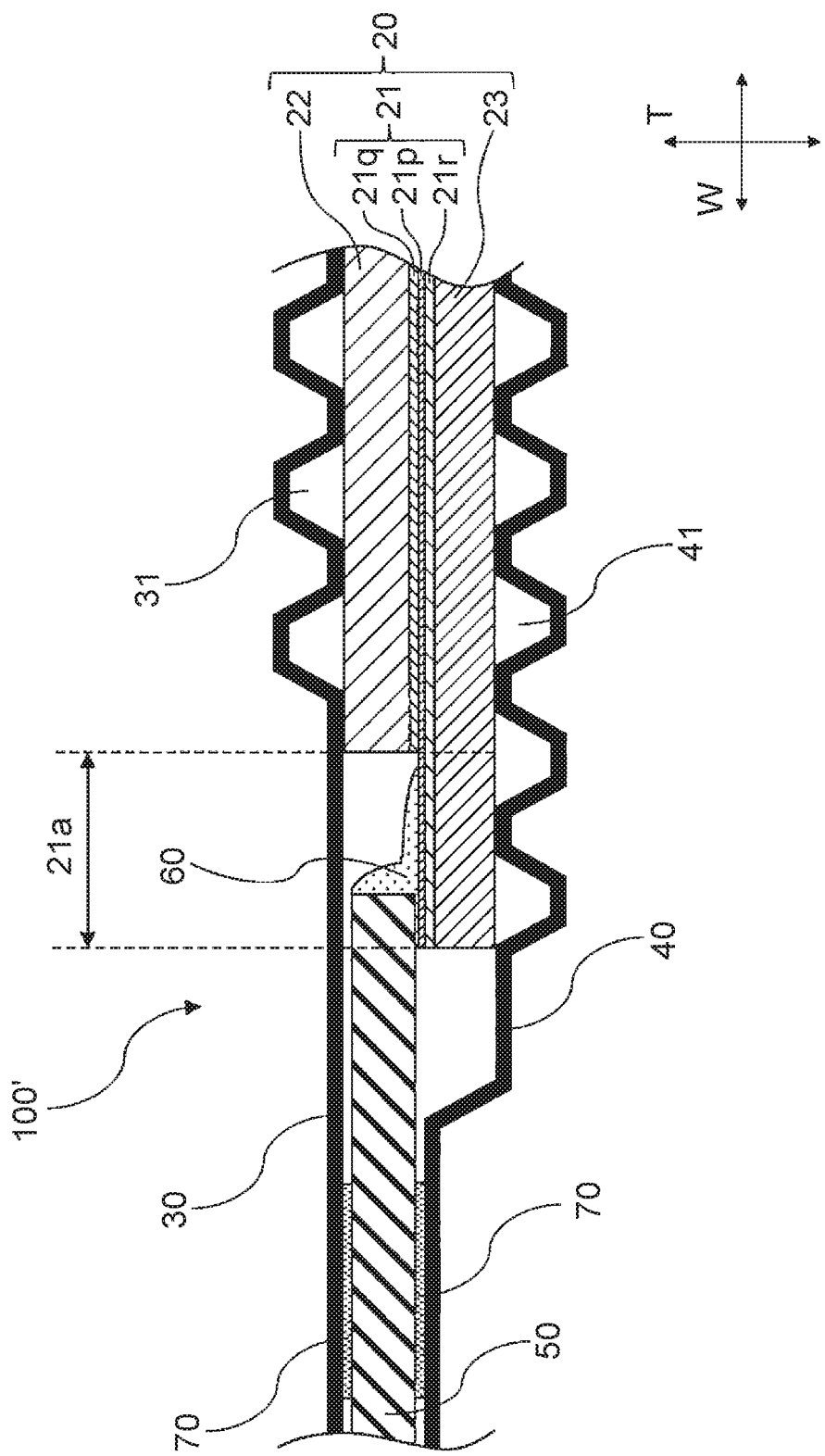

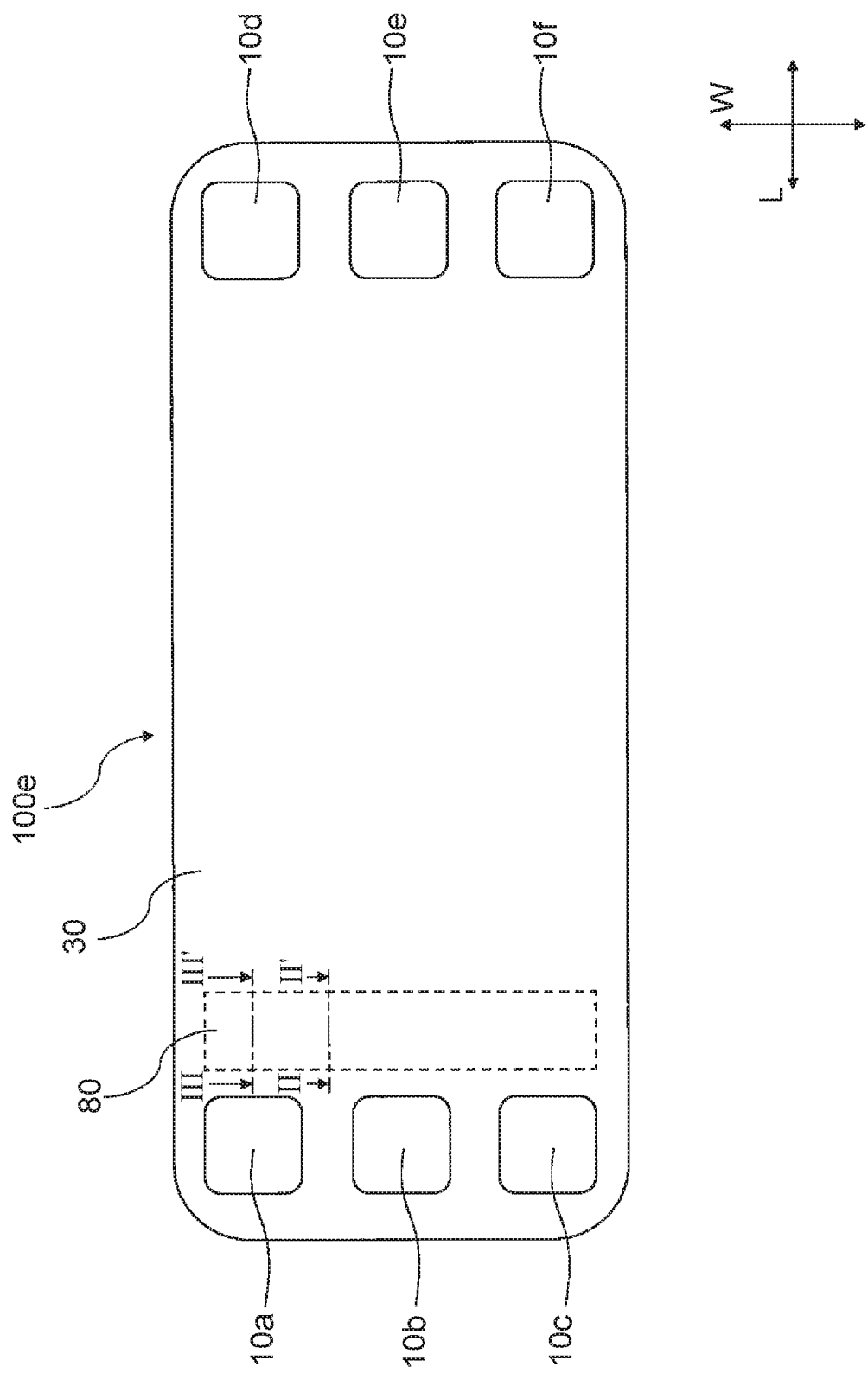

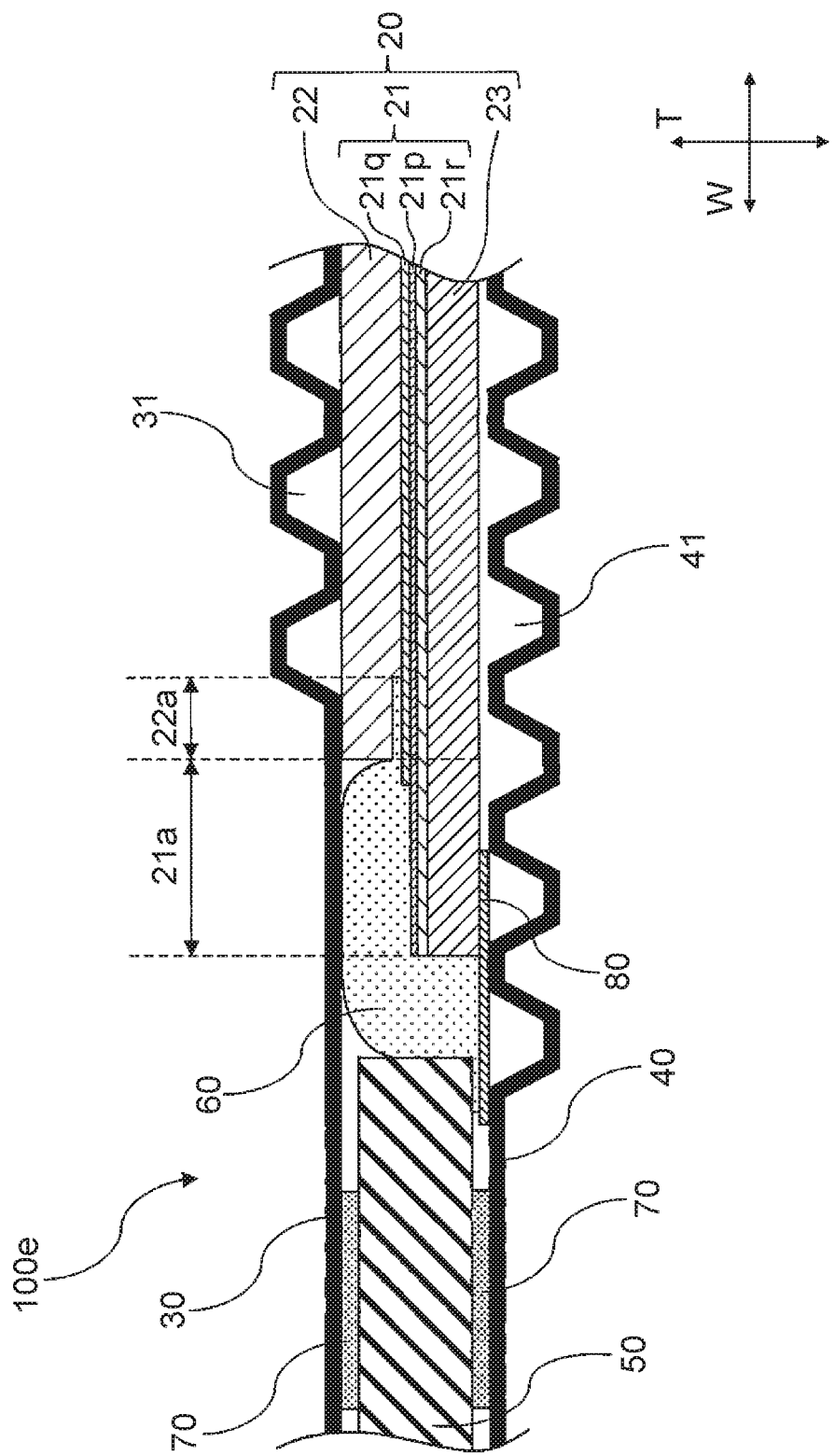

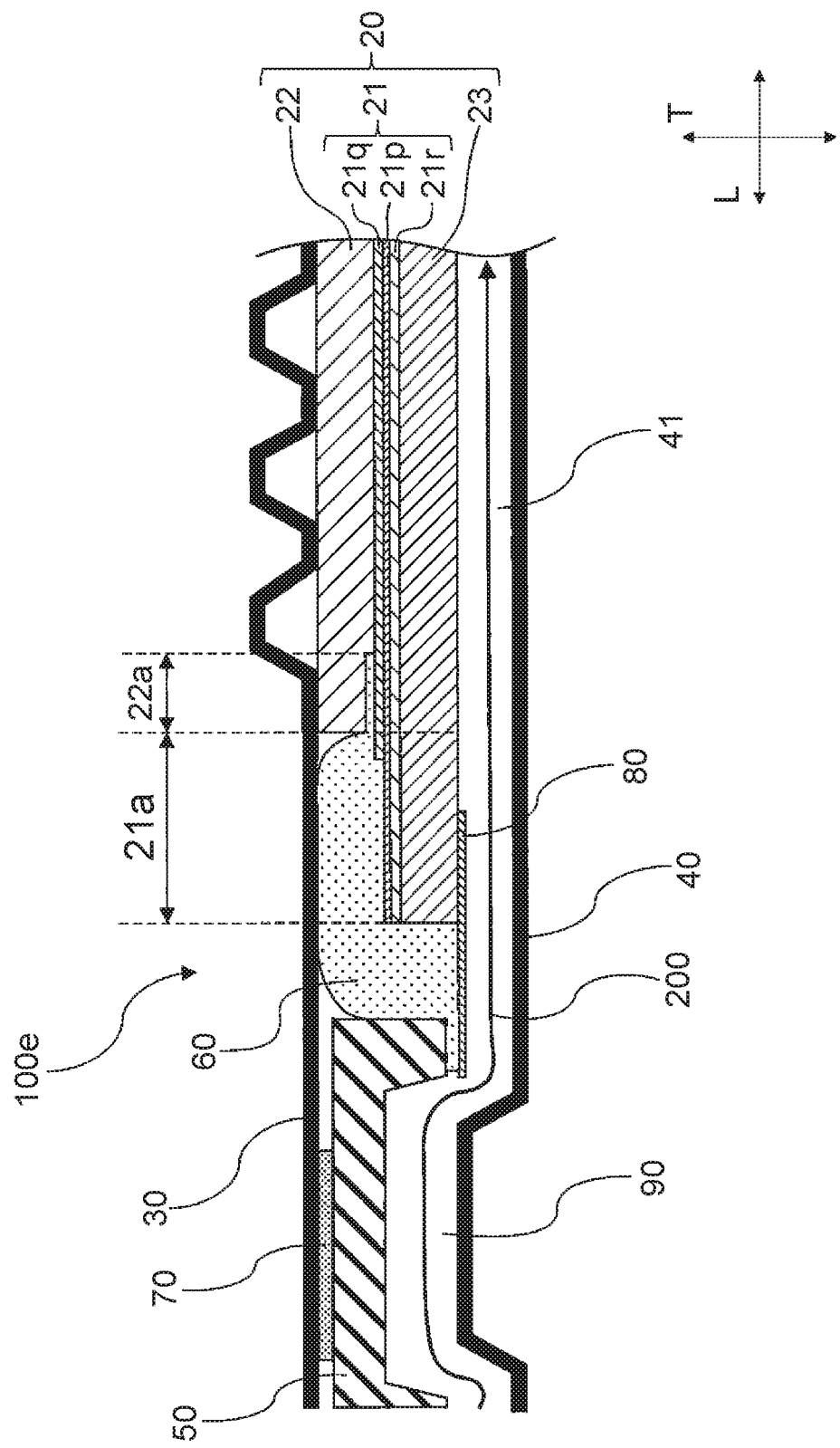

FUEL-CELL UNIT CELL

INCORPORATION BY REFERENCE

The disclosure of Japanese Patent Application No. 2019-179799 filed on Sep. 30, 2019 including the specification, drawings and abstract is incorporated herein by reference in its entirety.

BACKGROUND

1. Technical Field

This disclosure relates to a fuel-cell unit cell.

2. Description of Related Art

In recent years, fuel cells that generate electricity by causing a chemical reaction between an anode gas, such as hydrogen, and a cathode gas, such as oxygen, have become known.

Among known fuel-cell unit cells that are constituent elements of such fuel cells, there are ones that have a configuration in which a gas diffusion layer and a separator are disposed on each surface of a membrane-electrode assembly having an electrolyte membrane and electrode catalyst layers respectively disposed on both surfaces of the electrolyte membrane.

Japanese Patent No. 5681792 discloses a structure of a fuel-cell unit cell in which a resin frame member is provided so as to surround a membrane-electrode assembly, and this resin frame member is partially fused to a gas diffusion layer to fix the membrane-electrode assembly and the resin frame member to each other.

Japanese Patent Application Publication No. 2016-162649 (JP 2016-162649 A) discloses a structure of a fuel-cell unit cell in which a membrane-electrode assembly and a support frame are fixed to each other by a bonding layer.

SUMMARY

The authors of this disclosure have found that the fuel-cell unit cells disclosed in Japanese Patent No. 5681792 and JP 2016-162649 A may deteriorate as an internal structure of the fuel-cell unit cells, for example, the membrane-electrode assembly tears and/or breaks during manufacturing of the fuel-cell unit cells, manufacturing of a fuel cell stack by stacking multiple fuel-cell unit cells, or usage of the fuel-cell unit cells, i.e., generation of electricity.

This problem is more specifically described as follows.

Gas diffusion layers used for fuel-cell unit cells are sometimes made of an electrically conductive porous material, such as non-woven carbon-fiber cloth. Some gas diffusion layers made of such a material have a rough end portion where, for example, carbon fibers are ruffled.

When such a gas diffusion layer is used, and the configuration in which a gas diffusion layer is directly laid on a first surface of a membrane-electrode assembly except for an outer peripheral edge portion of the membrane-electrode assembly as disclosed in Japanese Patent No. 5681792 and JP 2016-162649 A is adopted, the rough end portion of the gas diffusion layer, for example, the portion where carbon fibers are ruffled may dig into and damage the membrane-electrode assembly, and may further tear and/or break the membrane-electrode assembly, at a part where the end portion of the gas diffusion layer and the membrane-electrode assembly are in contact with each other.

If the membrane-electrode assembly gets damaged, the damaged portion becomes fragile and may lead to tear and/or breakage of the membrane-electrode assembly. If the membrane-electrode assembly tears and/or breaks, short-circuiting may occur inside the fuel-cell unit cell.

When the configuration in which there is a gap between a support frame and a gas diffusion layer as disclosed in JP 2016-162649 A is adopted, the portion of the fuel-cell unit cell where this gap is located, i.e., the portion where the membrane-electrode assembly is exposed may deform in a thickness direction and fracture due to a gas pressure difference between a cathode side and an anode side during usage of the fuel-cell unit cell.

Thus, there is need for further enhancing the durability of fuel-cell unit cells.

An object of this disclosure is to provide a fuel-cell unit cell having high mechanical durability.

The authors of this disclosure have found out the following solutions that can achieve this object:

First Aspect

A fuel-cell unit cell including:

(I) an electrode stack having (a) a membrane-electrode assembly in which electrode catalyst layers are respectively laid on both surfaces of an electrolyte layer, (b) a first gas diffusion layer laid on a first surface of the membrane-electrode assembly except for an outer peripheral edge portion of the membrane-electrode assembly, and (c) a second gas diffusion layer laid on a second surface of the membrane-electrode assembly;

(II) a support frame disposed so as to surround the first gas diffusion layer;

(III) a first separator that is laid on a side of the electrode stack on which the first gas diffusion layer is located, in contact with the first gas diffusion layer, and that is fixed to the support frame; and (IV) a second separator that is laid on a side of the electrode stack on which the second gas diffusion layer is located, in contact with the second gas diffusion layer, and that is fixed to the support frame, wherein, at a first part of the fuel-cell unit cell:

the fuel-cell unit cell has a bonding layer;

between an outer peripheral edge portion of the first gas diffusion layer and a portion of the membrane-electrode assembly on an inner side from the outer peripheral edge portion of the membrane-electrode assembly, the bonding layer bonds these portions together;

between the first separator and the outer peripheral edge portion of the membrane-electrode assembly, the bonding layer is bonded to at least the outer peripheral edge portion of the membrane-electrode assembly; and between the first separator and the support frame and/or between the second separator and the support frame, the bonding layer bonds these parts together.

Second Aspect

In the fuel-cell unit cell according to the first aspect, the thickness of the bonding layer between the first separator and the outer peripheral edge portion of the membrane-electrode assembly may be not smaller than 50% of the distance between the first separator and the outer peripheral edge portion of the membrane-electrode assembly.

Third Aspect

In the fuel-cell unit cell according to the first or second aspect, between the first separator and the outer peripheral edge portion of the membrane-electrode assembly at the first part, the bonding layer may bond the first separator and the outer peripheral edge portion together.

Fourth Aspect

In the fuel-cell unit cell according to any one of the first to third aspects, between the second separator and the support frame at the first part, the bonding layer may bond these parts together.

Fifth Aspect

In the fuel-cell unit cell according to the fourth aspect, at a second part of the fuel-cell unit cell:

the second separator may have a reactant gas flow passage;

a cover plate may extend from between the second separator and the second gas diffusion layer to between the second separator and the support frame;

between the outer peripheral edge portion of the first gas diffusion layer and the portion of the membrane-electrode assembly on the inner side from the outer peripheral edge portion of the membrane-electrode assembly, the bonding layer may bond these portions together;

between the first separator and the outer peripheral edge portion of the membrane-electrode assembly, the bonding layer may be bonded to the outer peripheral edge portion of the membrane-electrode assembly;

between the cover plate and the support frame, the bonding layer may bond these parts together; and the bonding layer may be thus separated from the reactant gas flow passage of the second separator.

Sixth Aspect

In the fuel-cell unit cell according to the fifth aspect, between the second separator and the support frame at the second part, the bonding layer may bond also these parts together.

Seventh Aspect

In the fuel-cell unit cell according to the fifth or sixth aspect, at a third part of the fuel-cell unit cell:

the fuel-cell unit cell may have, between the second separator and the support frame, a communication passage that traverses the support frame so as to allow communication between the outside of the fuel-cell unit cell and the reactant gas flow passage;

the cover plate may extend from between the second separator and the second gas diffusion layer to between the second separator and the support frame;

between the outer peripheral edge portion of the first gas diffusion layer and the portion of the membrane-electrode assembly on the inner side from the outer peripheral edge portion of the membrane-electrode assembly, the bonding layer may bond these portions together;

between the first separator and the outer peripheral edge portion of the membrane-electrode assembly, the bonding layer may be bonded to the outer peripheral edge portion of the membrane-electrode assembly;

between the cover plate and the support frame, the bonding layer may bond these parts together; and the bonding layer may be thus separated from the communication passage.

According to this disclosure, a fuel-cell unit cell having high mechanical durability can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a schematic view of a fuel-cell unit cell 100 as seen from the side of a first separator 30;

FIG. 2A is a sectional view of a fuel-cell unit cell 100*a* according to a first embodiment of this disclosure, taken along a section similar to section I-I' of FIG. 1;

FIG. 2B is a sectional view of a fuel-cell unit cell 100*b* according to a second embodiment of this disclosure, taken along section I-I' similar to section I-I' of FIG. 1;

FIG. 4 is a sectional view of a fuel-cell unit cell 100' that is not an embodiment of this disclosure, taken along a section similar to section I-I' of FIG. 1;

FIG. 5 is a schematic view of a fuel-cell unit cell 100*e* according to a fifth embodiment of this disclosure as seen from the side of the first separator 30;

FIG. 6 is a sectional view of the fuel-cell unit cell 100*e* according to the fifth embodiment of this disclosure, taken along section II-II'; and FIG. 7 is a sectional view of the fuel-cell unit cell 100*e* according to the fifth embodiment of this disclosure, taken along a section similar to section III-III' of FIG. 5.

DETAILED DESCRIPTION OF EMBODIMENTS

Figure 3A:
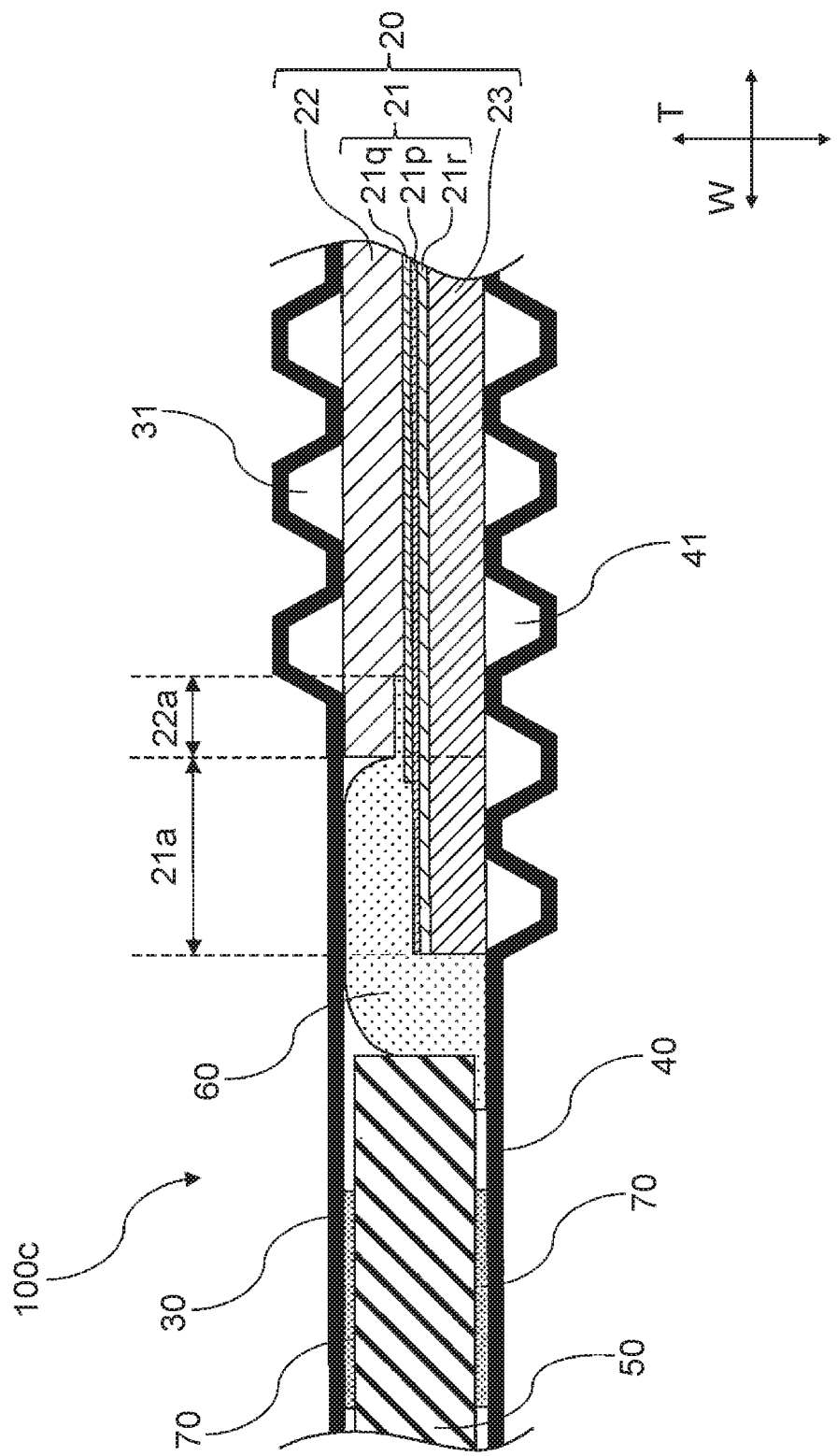
FIG. 3A is a sectional view of a fuel-cell unit cell 100*c* according to a third embodiment of this disclosure, taken along section I-I' similar to section I-I' of FIG. 1.

Embodiments of this disclosure will be described in detail below. This disclosure is not limited to the following embodiments but can be implemented with various changes made thereto within the scope of the gist of the disclosure.

A fuel-cell unit cell of this disclosure includes:

(I) an electrode stack having (a) a membrane-electrode assembly in which electrode catalyst layers are respectively laid on both surfaces of an electrolyte layer, (b) a first gas diffusion layer laid on a first surface of the membrane-electrode assembly except for an outer peripheral edge portion of the membrane-electrode assembly, and (c) a second gas diffusion layer laid on a second surface of the membrane-electrode assembly;

(II) a support frame disposed so as to surround the first gas diffusion layer;

(III) a first separator that is laid on a side of the electrode stack on which the first gas diffusion layer is located, in contact with the first gas diffusion layer, and that is fixed to the support frame; and (IV) a second separator that is laid on a side of the electrode stack on which the second gas diffusion layer is located, in contact with the second gas diffusion layer, and that is fixed to the support frame.

At a first part of the fuel-cell unit cell of this disclosure: the fuel-cell unit cell has a bonding layer; between an outer peripheral edge portion of the first gas diffusion layer and a portion of the membrane-electrode assembly on an inner side from the outer peripheral edge portion thereof, the bonding layer bonds these portions together; between the first separator and the outer peripheral edge portion of the membrane-electrode assembly, the bonding layer is bonded to at least the outer peripheral edge portion of the membrane-electrode assembly; and between the first separator and the support frame and/or between the second separator and the support frame, the bonding layer bonds these parts together.

The portion of the membrane-electrode assembly on the inner side from the outer peripheral edge portion thereof means a portion on the inner side from the outer peripheral edge portion in an in-plane direction of the membrane-electrode assembly.

First Part

At the first part of the fuel-cell unit cell of this disclosure: the fuel-cell unit cell has the bonding layer; between the outer peripheral edge portion of the first gas diffusion layer and the portion of the membrane-electrode assembly on the inner side from the outer peripheral edge portion thereof, the bonding layer bonds these portions together; between the first separator and the outer peripheral edge portion of the membrane-electrode assembly, the bonding layer is bonded to at least the outer peripheral edge portion of the membrane-electrode assembly; and between the first separator and the support frame and/or between the second separator and the support frame, the bonding layer bonds these parts together.

The principle underlying the high mechanical durability of the fuel-cell unit cell of this disclosure is, without it limiting the disclosure, as follows:

The first part of fuel-cell unit cell of this disclosure has the above-described configuration in which the bonding layer is interposed between an end portion of the gas diffusion layer and the membrane-electrode assembly. Thus, even when the gas diffusion layer has a rough end portion, for example, even when the gas diffusion layer made of an electrically conductive porous material, such as non-woven carbon-fiber cloth, has an end portion where carbon fibers are ruffled, this end portion of the gas diffusion layer and the membrane-electrode assembly do not directly come into contact with each other. It is therefore less likely that the rough end portion of the gas diffusion layer, for example, the portion where carbon fibers are ruffled may tear and/or break the membrane-electrode assembly by digging into the membrane-electrode assembly or damaging and further making a hole in the membrane-electrode assembly.

Between the first separator and the outer peripheral edge portion of the membrane-electrode assembly, the bonding layer is bonded to the outer peripheral edge portion of the membrane-electrode assembly, i.e., the portion of the membrane-electrode assembly that is exposed through a gap between the support frame and the first gas diffusion layer. Thus, this portion is reinforced by the bonding layer, so that the membrane-electrode assembly is less likely to deform due to a gas pressure difference between a cathode side and an anode side.

For these reasons, the fuel-cell unit cell of this disclosure has high mechanical durability.

This principle will be more specifically described using examples of fuel-cell unit cells according to embodiments of this disclosure and a fuel-cell unit cell that is not an embodiment of this disclosure.

FIG. 1 is a schematic view of a fuel-cell unit cell 100 as seen from the side of a first separator 30. In FIG. 1, L and W represent a longitudinal direction of the fuel-cell unit cell and a width direction of the fuel-cell unit cell, respectively.

As shown in FIG. 1, the fuel-cell unit cell 100 has, on the side of the first separator 30, first gas pass-through openings 10a, 10f, coolant pass-through openings 10b, 10e, and second gas pass-through openings 10c, 10d.

FIG. 2A is a sectional view of a fuel-cell unit cell 100a according to a first embodiment of this disclosure, taken along section I-I'. In FIG. 2A, W and T represent a width direction of the fuel-cell unit cell and a thickness direction, i.e., a stacking direction of the fuel-cell unit cell, respectively.

As shown in FIG. 2A, the fuel-cell unit cell 100a according to the first embodiment of this disclosure has an electrode stack 20. The electrode stack 20 has: a membrane-electrode assembly 21 in which electrode catalyst layers 21q, 21r are respectively laid on both surfaces of an electrolyte layer 21p; a first gas diffusion layer 22 laid on a first surface of the membrane-electrode assembly 21 except for an outer peripheral edge portion 21a of the membrane-electrode assembly 21; and a second gas diffusion layer 23 laid on a second surface of the membrane-electrode assembly 21.

The fuel-cell unit cell 100a according to the first embodiment of this disclosure further has: a support frame 50 disposed so as to surround the first gas diffusion layer 22; the first separator 30 that is laid on a side of the electrode stack 20 on which the first gas diffusion layer 22 is located, in contact with the first gas diffusion layer 22, and that is fixed to the support frame 50; and a second separator 40 that is laid on a side of the electrode stack 20 on which the second gas diffusion layer 23 is located, in contact with the second gas diffusion layer 23, and that is fixed to the support frame 50.

The first separator 30 and the second separator 40 have reactant gas flow passages 31, 41, respectively.

In FIG. 2A, the support frame 50 is disposed so as to surround the first gas diffusion layer 22 and the electrode stack 20. However, the support frame 50 should be disposed so as to surround at least the first gas diffusion layer 22. For example, as in a fuel-cell unit cell 100b according to a second embodiment of this disclosure shown in FIG. 2B, the support frame 50 may be disposed so as to overlap the membrane-electrode assembly 21 in the thickness direction T of the fuel-cell unit cell 100b.

At a first part of the fuel-cell unit cell 100a: the fuel-cell unit cell 100a has a bonding layer 60; between an outer peripheral edge portion 22a of the first gas diffusion layer 22 and a portion of the membrane-electrode assembly 21 on an inner side from the outer peripheral edge portion 21a, the bonding layer 60 bonds these portions together; between the first separator 30 and the outer peripheral edge portion 21a of the membrane-electrode assembly 21, the bonding layer 60 is bonded to at least the outer peripheral edge portion 21a of the membrane-electrode assembly 21; and between the first separator 30 and the support frame 50 and/or between the second separator 40 and the support frame 50, the bonding layer 60 bonds these parts together. The support frame 50 is bonded to the first separator 30 and the second separator 40 by separate bonding layers 70, although this configuration is not essential for the fuel-cell unit cell of this disclosure.

Thus, the bonding layer 60 is interposed between an end portion of the first gas diffusion layer 22 and the membrane-electrode assembly 21, so that the end portion of the first gas diffusion layer 22 and the membrane-electrode assembly 21 do not directly come into contact with each other. Therefore, even when the first gas diffusion layer 22 has a rough end portion, the membrane-electrode assembly 21 is less likely to get damaged.

Between the first separator 30 and the outer peripheral edge portion 21a of the membrane-electrode assembly 21, the bonding layer 60 is bonded to the outer peripheral edge portion 21a of the membrane-electrode assembly 21. Thus, this portion is reinforced by the bonding layer 60, so that the membrane-electrode assembly 21 is less likely to deform due to a gas pressure difference between the cathode side and the anode side.

Further, an end portion of the support frame 50 facing the first gas diffusion layer 22 is fixed by the first separator 30. Thus, even when the support frame 50 deforms by expanding or contracting due to heat resulting from using the fuel-cell unit cell 100a, i.e., generating electricity, the relationship between the relative positions of the support frame 50 and the membrane-electrode assembly 21 is less likely to change. Therefore, the mechanical durability of the fuel-cell unit cell 100a, especially that during usage of the fuel-cell unit cell, can be further enhanced.

Figure 3B:
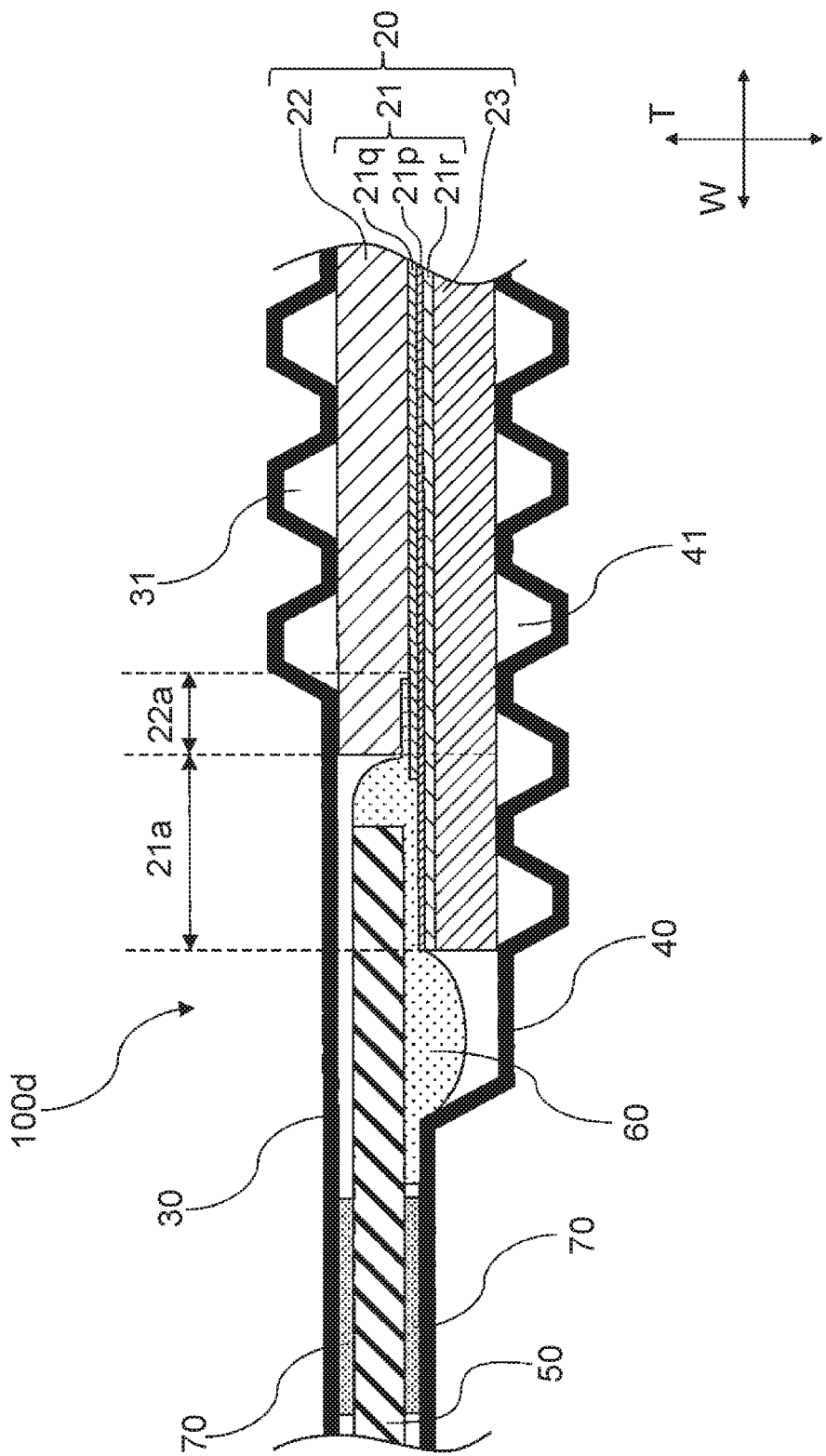
FIG. 3B is a sectional view of a fuel-cell unit cell 100*d* according to a fourth embodiment of this disclosure, taken along section I-I' similar to section I-I' of FIG. 1.

Between the second separator 40 and the support frame 50, the bonding layer 60 may bond these parts together, as in a fuel-cell unit cell 100c according to a third embodiment of this disclosure shown in FIG. 3A and a fuel-cell unit cell 100d according to a fourth embodiment of this disclosure shown in FIG. 3B.

By contrast, for example, in a fuel-cell unit cell 100' as shown in FIG. 4 that is not an embodiment of this disclosure, the end portion of the first gas diffusion layer 22 and the membrane-electrode assembly 21 are directly in contact with each other. Thus, the rough end portion of the first gas diffusion layer 22 may damage and further make a hole in the membrane-electrode assembly 21, at the part where the end portion of the first gas diffusion layer 22 and the membrane-electrode assembly 21 are in contact with each other.

Moreover, there is a portion between the first separator 30 and the outer peripheral edge portion 21a of the membrane-electrode assembly 21 where the bonding layer 60 is not bonded to the outer peripheral edge portion 21a of the membrane-electrode assembly 21, so that the membrane-electrode assembly 21 is likely to deform and get damaged at this portion due to a gas pressure difference between the cathode side and the anode side during usage of the fuel-cell unit cell.

The thickness of the bonding layer between the first separator and the outer peripheral edge portion of the membrane-electrode assembly at the first part is preferably not smaller than 50% of the distance between the first separator and the outer peripheral edge portion of the membrane-electrode assembly. Thus, the outer peripheral edge portion of the membrane-electrode assembly is further reinforced, so that the membrane-electrode assembly is even less likely to deform due to a gas pressure difference between the cathode side and the anode side during usage of the fuel-cell unit cell.

The thickness of the bonding layer between the first separator and the outer peripheral edge portion of the membrane-electrode assembly may be not smaller than 50%, 60%, 70%, or 80% of the distance between the first separator and the outer peripheral edge portion of the membrane-electrode assembly. The thickness of the bonding layer is more preferably 100% of the distance, which means that the bonding layer between the first separator and the outer peripheral edge portion of the membrane-electrode assembly bonds the first separator and the outer peripheral edge portion together.

Second Part

When the bonding layer between the second separator and the support frame bonds these parts together at the first part of the fuel-cell unit cell of this disclosure, at a second part of the fuel-cell unit cell: the second separator may have a reactant gas flow passage; a cover plate may extend from between the second separator and the second gas diffusion layer to between the second separator and the support frame; between the outer peripheral edge portion of the first gas diffusion layer and the portion of the membrane-electrode assembly on the inner side from the outer peripheral edge portion thereof, the bonding layer may bond these portions together; between the first separator and the outer peripheral edge portion of the membrane-electrode assembly, the bonding layer may be bonded to the outer peripheral edge portion of the membrane-electrode assembly; between the cover plate and the support frame, the bonding layer may bond these parts together; and the bonding layer may be thus separated from the reactant gas flow passage of the second separator.

Here, the reactant gas flow passage is a flow passage that is used to supply a reactant gas, supplied from the outside of the fuel-cell unit cell, to the gas diffusion layer of the fuel-cell unit cell, and to discharge a reactant gas that has not been consumed in cell reactions to the outside of the fuel-cell unit cell. Examples of the reactant gas include an anode gas, such as a hydrogen gas, and a cathode gas, such as an oxygen gas.

When the second part of the fuel-cell unit cell of this disclosure has the above-described configuration in which the cover plate extends from between the second separator and the second gas diffusion layer to between the second separator and the support frame, the bonding layer is separated from the reactant gas flow passage of the second separator, so that the bonding layer while being formed is less likely to penetrate into and close the reactant gas flow passage. Moreover, as high mechanical durability as at the first part can be achieved at the second part.

At the second part of the fuel-cell unit cell of this disclosure, the bonding layer between the second separator and the support frame may also bond these parts together.

Since the cover plate and the second separator are thus bonded together through the bonding layer, even when, for example, stress is applied to the fuel-cell unit cell from the outside and the fuel-cell unit cell warps in an in-plane direction, the positional relationship between the cover plate and the second separator is less likely to change. Therefore, the strength of the second part of the fuel-cell unit cell can be further enhanced.

The thickness of the bonding layer between the first separator and the outer peripheral edge portion of the membrane-electrode assembly at the second part is preferably not smaller than 50% of the distance between the first separator and the outer peripheral edge portion of the membrane-electrode assembly. Thus, the outer peripheral edge portion of the membrane-electrode assembly is further reinforced, so that the membrane-electrode assembly is even less likely to deform due to a gas pressure difference between the cathode side and the anode side during usage of the fuel-cell unit cell.

The thickness of the bonding layer between the first separator and the outer peripheral edge portion of the membrane-electrode assembly may be not smaller than 50%, 60%, 70%, or 80% of the distance between the first separator and the outer peripheral edge portion of the membrane-electrode assembly. The thickness of the bonding layer is more preferably 100% of the distance, which means that the bonding layer between the first separator and the outer peripheral edge portion of the membrane-electrode assembly bonds the first separator and the outer peripheral edge portion together.

The position of the second part in the fuel-cell unit cell of this disclosure is not particularly limited. For example, the second part can be disposed in an area adjacent to the first gas pass-through openings 10a, 10f, the coolant pass-through openings 10b, 10e, or the second gas pass-through openings 10c, 10d, like the area where section II-II' of FIG. 5 is located.

Specifically, the second part may have the configuration as shown in FIG. 6.

FIG. 6 is a sectional view of a fuel-cell unit cell 100e according to a fifth embodiment of this disclosure, taken along section II-II'.

As shown in FIG. 6, at the second part of the fuel-cell unit cell 100e according to the fifth embodiment of this disclosure: the second separator 40 may have the reactant gas flow passages 41; a cover plate 80 may extend from between the second separator 40 and the second gas diffusion layer 23 to between the second separator 40 and the support frame 50; between the outer peripheral edge portion 22a of the first gas diffusion layer 22 and the portion of the membrane-electrode assembly 21 on the inner side from the outer peripheral edge portion 21a, the bonding layer 60 may bond these portions together; between the first separator 30 and the outer peripheral edge portion 21a of the membrane-electrode assembly 21, the bonding layer 60 may be bonded to the outer peripheral edge portion 21a of the membrane-electrode assembly 21; between the cover plate 80 and the support frame 50, the bonding layer 60 may bond these parts together; and the bonding layer 60 may be thus separated from the reactant gas flow passages 41 of the second separator 40.

Third Part

When the second part of the fuel-cell unit cell of this disclosure has the above-described configuration, at a third part of the fuel-cell unit cell: the fuel-cell unit cell may have, between the second separator and the support frame, a communication passage that traverses the support frame so as to allow communication between the outside of the fuel-cell unit cell and the reactant gas flow passage; a cover plate may extend from between the second separator and the second gas diffusion layer to between the second separator and the support frame; between the outer peripheral edge portion of the first gas diffusion layer and the portion of the membrane-electrode assembly on the inner side from the outer peripheral edge portion, the bonding layer may bond these portions together; between the first separator and the outer peripheral edge portion of the membrane-electrode assembly, the bonding layer may be bonded to the outer peripheral edge portion of the membrane-electrode assembly; between the cover plate and the support frame, the bonding layer may bond these parts together; and the bonding layer may be thus separated from the communication passage.

Here, the communication passage is a passage that traverses the support frame so as to allow communication between the outside of the fuel-cell unit cell and the reactant gas flow passage. The communication passage is a passage through which the reactant gas flows in and out between the outside and inside of the fuel-cell unit cell. Examples of the reactant gas include an anode gas, such as a hydrogen gas, and a cathode gas, such as an oxygen gas.

When the third part of the fuel-cell unit cell of this disclosure has the above-described configuration in which the communication passage is formed between the second separator and the support frame and the bonding layer is separated from the communication passage at the third part, the bonding layer is less likely to close the communication passage. Moreover, as high mechanical durability as at the first part can be achieved at the third part.

The thickness of the bonding layer between the first separator and the outer peripheral edge portion of the membrane-electrode assembly at the third part is preferably not smaller than 50% of the distance between the first separator and the outer peripheral edge portion of the membrane-electrode assembly. Thus, the outer peripheral edge portion of the membrane-electrode assembly is further reinforced, so that the membrane-electrode assembly is even less likely to deform due to a gas pressure difference between the cathode side and the anode side during usage of the fuel-cell unit cell.

The thickness of the bonding layer between the first separator and the outer peripheral edge portion of the membrane-electrode assembly may be not smaller than 50%, 60%, 70%, or 80% of the distance between the first separator and the outer peripheral edge portion of the membrane-electrode assembly. The thickness of the bonding layer is more preferably 100% of the distance, which means that the bonding layer between the first separator and the outer peripheral edge portion of the membrane-electrode assembly bonds the first separator and the outer peripheral edge portion together.

The position of the third part in the fuel-cell unit cell of this disclosure is not particularly limited. For example, the third part can be disposed in an area where the first gas pass-through openings 10a, 10f, the coolant pass-through openings 10b, 10e, or the second gas pass-through openings 10c, 10d are disposed, like the area where section III-III' of FIG. 5 is located.

When the second part of the fuel-cell unit cell of this disclosure has, for example, the structure as shown in FIG. 6, the third part thereof may have, for example, the structure as shown in FIG. 7.

FIG. 7 is a sectional view of the fuel-cell unit cell 100e according to the fifth embodiment of this disclosure, taken along section III-III'.

As shown in FIG. 7, the fuel-cell unit cell 100e of this disclosure has, between the second separator 40 and the support frame 50, a communication passage 90 that traverses the support frame 50 so as to allow communication between the outside of the fuel-cell unit cell 100e and the reactant gas flow passage 41. The cover plate 80 extends from between the second separator 40 and the second gas diffusion layer 23 to between the second separator 40 and the support frame 50. Between the outer peripheral edge portion 22a of the first gas diffusion layer 22 and the portion of the membrane-electrode assembly 21 on the inner side from the outer peripheral edge portion 21a, the bonding layer 60 bonds these portions together. Between the first separator 30 and the outer peripheral edge portion 21a of the membrane-electrode assembly 21, the bonding layer 60 is bonded to the outer peripheral edge portion 21a of the membrane-electrode assembly 21. Between the cover plate 80 and the support frame 50, the bonding layer 60 bonds these parts together. The bonding layer 60 is thus separated from the communication passage 90.

Electrode Stack

In this disclosure, the electrode stack has the following (a) to (c):

(a) a membrane-electrode assembly in which electrode catalyst layers are respectively laid on both surfaces of an electrolyte layer;

(b) a first gas diffusion layer laid on a first surface of the membrane-electrode assembly except for an outer peripheral edge portion of the membrane-electrode assembly; and (c) a second gas diffusion layer laid on a second surface of the membrane-electrode assembly.

Membrane-Electrode Assembly

The membrane-electrode assembly has the electrolyte layer and the electrode catalyst layers respectively laid on both surfaces of the electrolyte layer.

Electrolyte Layer

An arbitrary material that can be used for an electrolyte layer of a fuel-cell unit cell can be used as the material of the electrolyte layer. Examples of such a material include fluorine polymer membranes having ion conductivity, more specifically, ion-exchange membranes having proton conductivity and containing perfluorosulfonic acid.

Electrode Catalyst Layer

Examples of the electrode catalyst layer include an anode catalyst layer and a cathode catalyst layer. The anode catalyst layer and the cathode catalyst layer may be catalyst layers in which a catalytic metal is supported by a carrier.

The catalytic metal may be an arbitrary catalytic metal that is used for a fuel cell catalyst. Examples of such a catalytic metal include Pt, Pd, Rh, and alloys containing these metals.

The carrier may be an arbitrary carrier that is used for a fuel cell catalyst. Examples of such a carrier include carbon carriers, more specifically, carbon particles of glassy carbon, carbon black, active carbon, coke, natural graphite, artificial graphite, or the like.

Gas Diffusion Layer

In this disclosure, the first gas diffusion layer is laid on the first surface of the membrane-electrode assembly except for the outer peripheral edge portion thereof, and the second gas diffusion layer is laid on the second surface of the membrane-electrode assembly.

Of the first gas diffusion layer and the second gas diffusion layer, one is an anode gas diffusion layer and the other is a cathode gas diffusion layer.

The material of the first gas diffusion layer and the second gas diffusion layer may be an arbitrary material that can be used for an anode gas diffusion layer and a cathode gas diffusion layer of a fuel cell catalyst. Examples of such a material include electrically conductive porous materials. More specifically, examples of such porous materials include porous carbon materials, such as carbon paper, carbon cloth, and glasslike carbon, and porous metal materials, such as metal mesh and foam metal.

Support Frame

The support frame is disposed so as to surround the first gas diffusion layer.

When the fuel-cell unit cell of this disclosure has the third part, the support frame may have, at the third part, a groove that allows communication between the inside and outside of the fuel-cell unit cell, and the communication passage may be formed by this groove.

The support frame is made of an arbitrary material that can provide electrical insulation and airtightness. Examples of such a material include crystalline polymers, more specifically, engineering plastics. Examples of engineering plastics include polyethylene naphthalate (PEN) resins and polyethylene terephthalate (PET) resins.

First Separator

The first separator is laid on a side of the electrode stack on which the first gas diffusion layer is located, in contact with the first gas diffusion layer, and is fixed to the support frame.

The first separator may have a plurality of grooves in a surface facing the first gas diffusion layer, and the reactant gas flow passages may be formed by these grooves. The grooves may have an arbitrary shape, for example, a serpentine shape, as long as the grooves can supply the reactant gas to the first gas diffusion layer.

The first separator may have a first gas pass-through opening, a coolant pass-through opening, and a second gas pass-through opening.

The material of the first separator may be an arbitrary material that can be used for a separator of a fuel-cell unit cell, and may be a material having gas impermeability and electrical conductivity. Examples of such a material include dense carbon formed by compressing carbon so as to have gas impermeability, and metal plates formed by pressing.

Second Separator

The second separator is laid on a side of the electrode stack on which the second gas diffusion layer is located, in contact with the second gas diffusion layer, and is fixed to the support frame.

The material and structure of the second separator may be the same as those of the first separator.

Bonding Layer

As the bonding layer, a layer of an arbitrary adhesive can be used that can bond together the first separator, the first gas diffusion layer, the membrane-electrode assembly, the support frame, and the second separator, and that can keep these members bonded together under the service conditions of the fuel-cell unit cell.

Examples of such an adhesive include, but are not limited to, adhesive resins such as thermoplastic resins, thermosetting resins, and UV-curing resins. When a thermoplastic resin is used as the adhesive, that resin preferably has a softening point higher than the temperature of heat generated during usage of the fuel-cell unit cell.

Cover Plate

The material of the cover plate is not particularly limited as long as it is a sheet-shaped material that can be bonded to the first gas diffusion layer, the membrane-electrode assembly, and the support frame by the bonding layer. Examples of such a material include titanium, stainless steel, polyphenylene sulfide (PPS), and polypropylene (PP).

None of the drawings used to describe this disclosure is intended to limit the configuration, structure, and other features of the fuel-cell unit cell of this disclosure.

What is claimed is:

1. A fuel-cell unit cell comprising:
   (I) an electrode stack having
      (a) a membrane-electrode assembly in which electrode catalyst layers are respectively laid on both surfaces of an electrolyte layer,
      (b) a first gas diffusion layer laid on a first surface of the membrane-electrode assembly except for an outer peripheral edge portion of the membrane-electrode assembly, and
      (c) a second gas diffusion layer laid on a second surface of the membrane-electrode assembly;
   (II) a support frame disposed so as to surround the first gas diffusion layer;
   (III) a first separator that is laid on a side of the electrode stack on which the first gas diffusion layer is located, in contact with the first gas diffusion layer, and that is fixed to the support frame; and
   (IV) a second separator that is laid on a side of the electrode stack on which the second gas diffusion layer is located, in contact with the second gas diffusion layer, and that is fixed to the support frame, wherein
      a first part of the fuel-cell unit cell comprises a bonding layer;
      between an outer peripheral edge portion of the first gas diffusion layer and a portion of the membrane-electrode assembly on an inner side from the outer peripheral edge portion of the membrane-electrode assembly, the bonding layer bonds these portions together;

between the first separator and the outer peripheral edge portion of the membrane-electrode assembly, the bonding layer is bonded to at least the outer peripheral edge portion of the membrane-electrode assembly; and between the first separator and the support frame and/or between the second separator and the support frame, the bonding layer bonds these parts together.

2. The fuel-cell unit cell according to claim 1, wherein a thickness of the bonding layer between the first separator and the outer peripheral edge portion of the membrane-electrode assembly is not smaller than 50% of a distance between the first separator and the outer peripheral edge portion of the membrane-electrode assembly.

3. The fuel-cell unit cell according to claim 1, wherein, between the first separator and the outer peripheral edge portion of the membrane-electrode assembly at the first part, the bonding layer bonds the first separator and the outer peripheral edge portion together.

4. The fuel-cell unit cell according to claim 1, wherein, between the second separator and the support frame at the first part, the bonding layer bonds these parts together.

5. The fuel-cell unit cell according to claim 4, wherein, at a second part of the fuel-cell unit cell,
the second separator has a reactant gas flow passage;
a cover plate extends from between the second separator and the second gas diffusion layer to between the second separator and the support frame;
between the outer peripheral edge portion of the first gas diffusion layer and the portion of the membrane-electrode assembly on the inner side from the outer peripheral edge portion of the membrane-electrode assembly, the bonding layer bonds these portions together;
between the first separator and the outer peripheral edge portion of the membrane-electrode assembly, the bonding layer is bonded to the outer peripheral edge portion of the membrane-electrode assembly; and
between the cover plate and the support frame, the bonding layer bonds these parts together; and
the bonding layer is thus separated from the reactant gas flow passage of the second separator.

6. The fuel-cell unit cell according to claim 5, wherein, between the second separator and the support frame at the second part, the bonding layer bonds also these parts together.

7. The fuel-cell unit cell according to claim 5, wherein, at a third part of the fuel-cell unit cell,
the fuel-cell unit cell has, between the second separator and the support frame, a communication passage that traverses the support frame so as to allow communication between an outside of the fuel-cell unit cell and the reactant gas flow passage;
the cover plate extends from between the second separator and the second gas diffusion layer to between the second separator and the support frame;
between the outer peripheral edge portion of the first gas diffusion layer and the portion of the membrane-electrode assembly on the inner side from the outer peripheral edge portion of the membrane-electrode assembly, the bonding layer bonds these portions together;
between the first separator and the outer peripheral edge portion of the membrane-electrode assembly, the bonding layer is bonded to the outer peripheral edge portion of the membrane-electrode assembly;
between the cover plate and the support frame, the bonding layer bonds these parts together; and
the bonding layer is thus separated from the communication passage.

* * * * *